Sept. 21, 1943.  G. R. NEVILLE  2,330,004
HYDRAULIC BRAKE
Filed Oct. 23, 1941  2 Sheets-Sheet 2

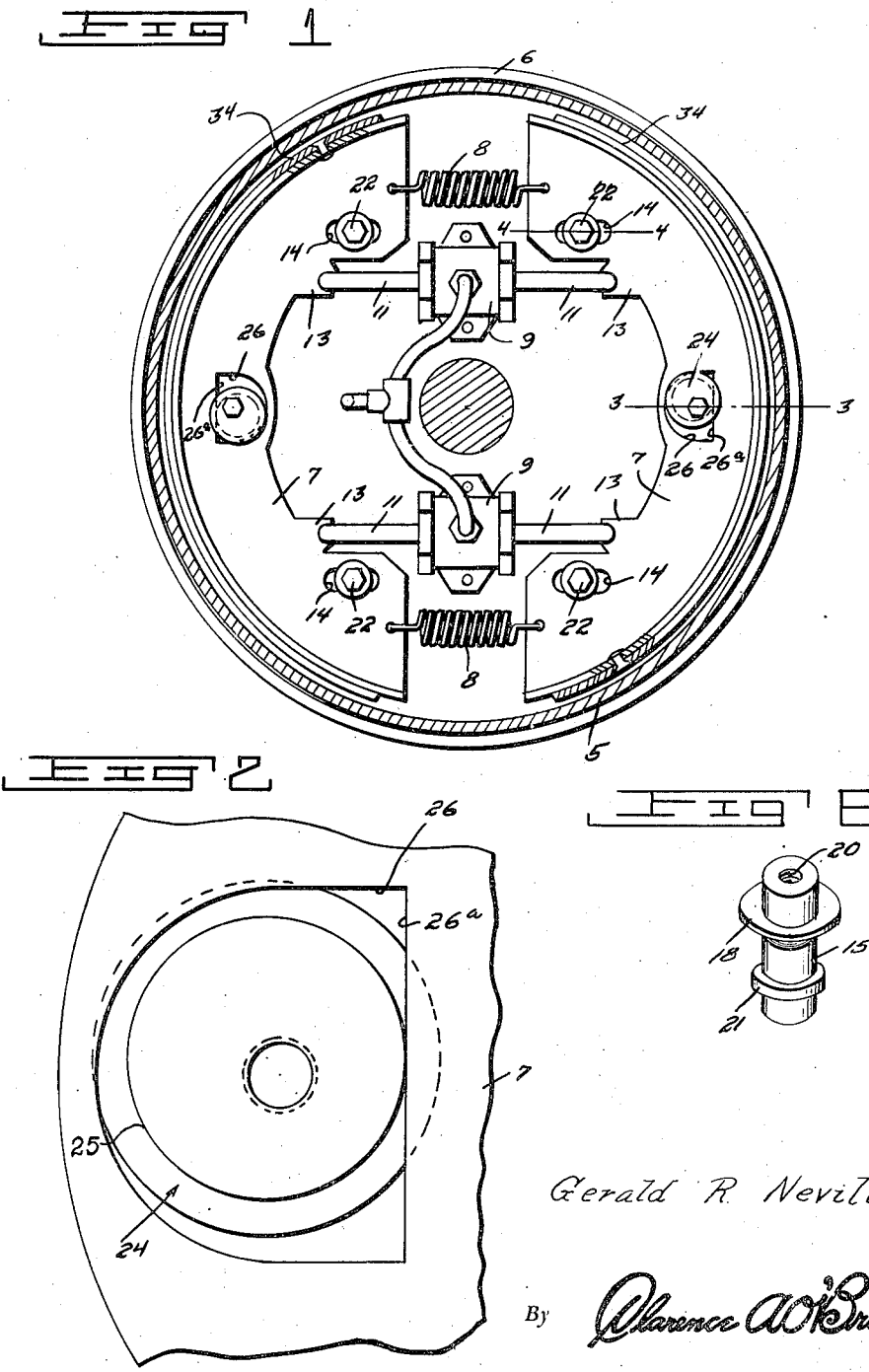

Inventor
Gerald R. Neville

By Clarence A. O'Brien

Attorney

Patented Sept. 21, 1943

2,330,004

UNITED STATES PATENT OFFICE 2,330,004

HYDRAULIC BRAKE

Gerald R. Neville, Syracuse, N. Y.

Application October 23, 1941, Serial No. 416,264

1 Claim. (Cl. 188—79.5)

This invention relates to hydraulic vehicle wheel brakes, and an object of the present invention is to provide a brake of this character so equipped as to facilitate the adjustment of the shoes of the brake as wear on the brake linings occurs.

Further it is an object of the invention to provide an improved hydraulic vehicle wheel brake equipped with means to facilitate manual adjustment of the brake shoes to compensate for wear; and at the same time to provide such a wheel brake as will have many advantages over the generally known types of hydraulic wheel brakes.

Among such advantages may be mentioned that the brake of the present invention is such as will accurately distribute the pressure of the shoes against the drum under all conditions; the life of the brake lining will be extended; squeaking and chatter eliminated; will have smooth braking action; and be economical.

The invention together with its objects and advantages will be best understood from a study of the following description taken in connection with the accompanying drawings wherein:

Figure 1 is a sectional view through the drum of an hydraulic vehicle wheel brake illustrating my invention as applied thereto.

Figure 2 is an enlarged detail elevational view showing an adjusting cam associated with a brake shoe in accordance with the present invention.

Figure 6 is a perspective view of a guide lug forming part of the invention.

Figure 3:
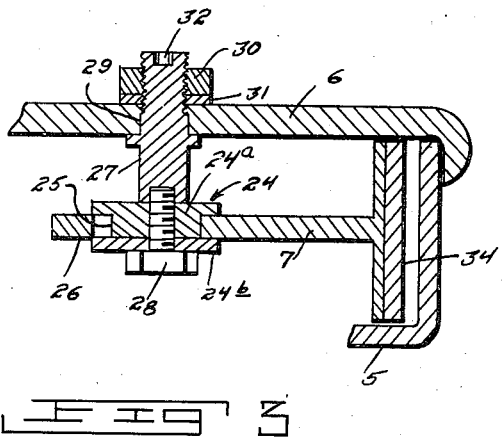
Figure 3 is a detail sectional view taken substantially on the line 3—3 of Figure 1.
Figure 5:
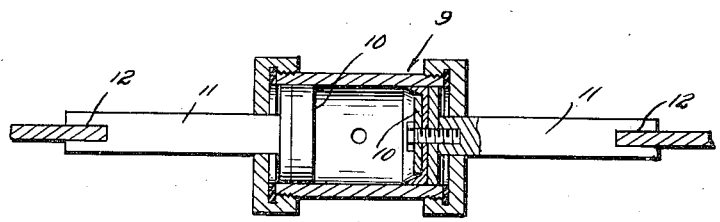
Figure 5 is a sectional view through one of the cylinders of the brake.

Referring more in detail to the drawings it will be seen that 5 indicates generally a conventional hydraulic brake drum, fragmentarily shown in the drawings, while 6 indicates the stationary cover plate.

The brake shoes are indicated by the reference numeral 7—7 and, as conventional, are connected at their confronting ends through the medium of coil springs 8—8 that serve to return the shoes to released position.

The reference numerals 9—9 indicate the hydraulic cylinders in which operate the brake expanding pistons 10—10.

In the present instance I have shown the pistons 10 provided with removable rods 11—11, and of the type that have the free ends thereof bifurcated as at 12 to straddle and engage the integral abutment lugs 13—13 provided on the webs of the respective brake shoes 7.

In accordance with the present invention the shoes 7, respectively, are provided adjacent the ends thereof with guide slots 14 that preferably have rounded ends and accommodate guide studs 15.

Figure 4:
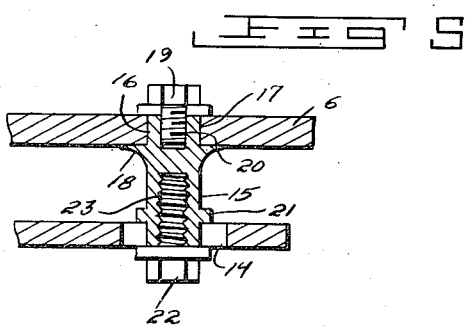
Figure 4 is a detail sectional view taken substantially on the line 4—4 of Figure 1.

As shown to advantage in Figure 4 each stud 15 has an end 16 fitted within an opening 17 provided therefor in the plate 6 and secured within the opening through the medium of a shoulder 18 formed on the stud 15 and a stud bolt 19 that threads into an axial socket 20 provided therefor in the mentioned end of the stud 15.

The other end of the stud 15 is accommodated within the guide slot 14, and at said end the stud 15 is provided with a shoulder 21 between which, and the head of a stud bolt 22, the slotted portion of the web of the brake shoe is accommodated as shown in Figure 4.

The stud bolt 22 is threaded in an axial socket 23 provided therefor in the last-named end of the guide stud 15.

Further in accordance with the present invention means is provided to facilitate manual adjustment of the shoes 7 as wear occurs on the brake linings 24.

Such shoe-adjusting means embodies, for each shoe 7, an adjusting cam 24 that is provided in its periphery with a groove 25 that accommodates the edges of a substantially D-shaped opening 26 provided therefor in the web of a brake shoe 7.

The cam 24 is divided into two sections, 24a, 24b, that are secured together and to one end of a stud 27 through the medium of a stud bolt 28 as shown to advantage in Figure 3.

The stud 27 has an end thereof accommodated within an opening 29 provided therefor in the plate 6, and at said end is threaded to accommodate a lock nut 30 between which and the plate 6 is interposed a washer 31.

At the extremity of its threaded end the stud 27 is provided with a kerf or slot 32 to facilitate the application thereto of a suitable tool for turning the stud 27 and associated cam 24 for effecting a shifting of the associated shoe 7 on the guide stud 15 to effect an adjustment of the shoe in a manner to compensate for the wear on the lining 34, and to the end that the distance the brake pedal is normally required to travel for applying the brake will be maintained constant.

In connection with the adjustment of the brake shoe 7, as just described, it will be apparent that as the stud 27 is rotated, the periphery of the cam bearing against the straight edge 26a of the opening 26 will cause the shoe 7 to shift its position.

It will thus be seen that in a quick, efficient manner an adjustment of the shoes 7 can be effected to compensate for wear on the brake linings, and that such adjustment can be effected without dismantling the brake.

The advantage just mentioned, together with the advantages hereinabove enumerated will, it is believed, be fully appreciated by those skilled in the art, as will also the construction and operation of the brake embodying the features of the present invention, without further detailed description.

It is also to be understood that the embodiment of the invention as herein illustrated, and described, is but illustrative, as I am aware that in practical fields the details of construction may necessitate alterations falling within the scope of what is claimed.

Having thus described the invention what is claimed as new is:

In a vehicular wheel brake of the hydraulic type, a fixed brake plate, and shiftable brake shoes, and means for manually adjusting said shoes to compensate for wear of the brake linings, said means embodying, for each shoe, a stud rotatably mounted on said plate and having means at one end for rotating the stud, a cam, a bolt eccentrically threaded through the cam and into an opposite end of the stud for rotation of the cam with the stud, a flange on one end of the cam and a washer secured on the other end of the cam by said bolt and cooperating with the flange to form an annular channel and each brake shoe having in the web thereof a substantially D-shaped opening in which the channel of said cam is fitted to operate for transmitting shifting movements to the shoe.

GERALD R. NEVILLE.